(12) United States Patent
Long et al.

(10) Patent No.: US 8,390,729 B2
(45) Date of Patent: Mar. 5, 2013

(54) METHOD AND APPARATUS FOR PROVIDING A VIDEO IMAGE HAVING MULTIPLE FOCAL LENGTHS

(75) Inventors: David Clifford Long, Wappingers Falls, NY (US); Thomas J. Fleischman, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 11/850,185

(22) Filed: Sep. 5, 2007

(65) Prior Publication Data

US 2009/0059057 A1 Mar. 5, 2009

(51) Int. Cl.
*H04N 5/232* (2006.01)
(52) U.S. Cl. ......... 348/345; 348/349; 348/351; 348/340
(58) Field of Classification Search .................. None
See application file for complete search history.

(56) References Cited

U.S. PATENT DOCUMENTS

| | | | |
|---|---|---|---|
| 5,877,809 A * | 3/1999 | Omata et al. .................. | 348/345 |
| 5,917,657 A | 6/1999 | Kaneko et al. | |
| 6,344,930 B1 | 2/2002 | Kaneko et al. | |
| 6,927,922 B2 | 8/2005 | George et al. | |
| 7,057,650 B1 * | 6/2006 | Sakamoto ..................... | 348/239 |
| 7,110,185 B2 | 9/2006 | Saori | |
| 7,595,823 B2 * | 9/2009 | Yen et al. ...................... | 348/239 |
| 7,653,298 B2 * | 1/2010 | Ono .............................. | 396/121 |
| 7,916,172 B2 * | 3/2011 | Kagei ............................ | 348/169 |
| 7,924,311 B2 * | 4/2011 | Yoshida et al. ............... | 348/159 |
| 2001/0012063 A1 | 8/2001 | Maeda | |
| 2002/0036693 A1 * | 3/2002 | Kinjo ............................ | 348/218 |
| 2002/0097324 A1 * | 7/2002 | Onuki .......................... | 348/208 |
| 2003/0025821 A1 * | 2/2003 | Bean et al. .................... | 348/345 |
| 2003/0117501 A1 * | 6/2003 | Shirakawa ................. | 348/218.1 |
| 2004/0004614 A1 | 1/2004 | Bacus et al. | |
| 2004/0080661 A1 * | 4/2004 | Afsenius et al. ............. | 348/345 |
| 2007/0216796 A1 * | 9/2007 | Lenel et al. ................... | 348/345 |

FOREIGN PATENT DOCUMENTS

| | | |
|---|---|---|
| DE | 102004007608 A1 | 8/2005 |
| FR | 2616924 A1 | 12/1988 |
| GB | 2356114 A1 | 9/2001 |
| WO | WO 2005093510 A2 * | 10/2005 |

* cited by examiner

*Primary Examiner* — Chieh M Fan
*Assistant Examiner* — Dwight C Tejano
(74) *Attorney, Agent, or Firm* — Catherine Ivers; Wenjie Li; Ira D. Blecker

(57) ABSTRACT

A method and apparatus for providing a video image having multiple focal lengths includes a multi-focal lens system and a drive mechanism capable of moving the multi-focal lens system through a cyclic path. A plurality of optical images are formed as the multi-focal lens system moves through the cyclic path. An image pickup device is capable of converting each of the plurality of optical images into a corresponding image signal. An image processor is operative to preferably form a composite image signal wherein individual elements of the optical images are selected to provide preferred focus characteristics.

16 Claims, 5 Drawing Sheets

θ = 0° (F = F(0))

θ = 180° (F = F(180))

$\theta = 360° \ (F = F(360))$

METHOD AND APPARATUS FOR PROVIDING A VIDEO IMAGE HAVING MULTIPLE FOCAL LENGTHS

BACKGROUND OF THE INVENTION

The invention relates generally to digital video cameras, and more particularly to a digital video camera having a multi-focal lens system.

In conventional digital camera photography, typically a system of lenses is used to form an image which is captured by an image pickup device such as a charge-coupled device (CCD). The conventional lens system has, at any one time, a single focal length. By relative movement of lenses in the lens system, other focal lengths may be provided. With reference to FIG. 1, an image scene 10 may comprise a first object 12, such as a flower, positioned at a distance D1 close to a camera 20 having a lens or system of lenses 22. The lens system 22 may be configured to have a first focal length F1, such that objects very near the camera 20 falling within the first focal length F1 are in focus. The image scene 10 may farther comprise a second object 14, such as a rabbit, positioned at a distance D2 from the camera 20, falling outside the first focal length F1, and requiring a second focal length F2 to be in focus. Similarly, the image scene 10 may further comprise a third object 16, such as distant mountains, positioned at a great distance D3, falling outside both the first and second focal lengths F1 and F2, and requiring a third focal length F3 to be rendered in focus.

Multi-focal camera systems are known. U.S. Pat. No. 6,344,930 (Kancko et al.) discloses a total-focus imaging apparatus comprising a variable-focus lens unit having a focal position which is changeable at high speed. Known devices are limited, however, to providing composite images of fixed scenes, and are not suitable for the production of videos.

It would be desirable to provide an apparatus and associated method providing a video image having an extended depth of field wherein different objects at different distances are all in focus in a image of a common scene captured by a digital camera.

BRIEF SUMMARY OF THE INVENTION

Briefly stated, in a first aspect the invention is an imaging apparatus providing a composite video image having multiple focal lengths. The imaging apparatus comprises a multi-focal lens system capable of observing a scene. A drive mechanism capable of moving the multi-focal lens system through a cyclic path is provided. The multi-focal lens system forms a plurality of optical images as the multi-focal lens system moves through the cyclic path. Each optical image corresponds to one of the plurality of focal lengths. An image pickup device capable of converting each of the plurality of optical images into a corresponding image signal is provided. Each image signal includes a plurality of pixels representative of the scene. An image processor is operative to divide each image signal into a plurality of image elements, each image element including at least one pixel. The image processor is further operative to identify sets of corresponding image elements wherein each element corresponds to a given portion of the scene. For each set of corresponding image elements, the image processor selects a preferred image element which provides preferred focus characteristics, and saves in computer memory the preferred image element providing the preferred focus characteristics. The preferred image elements are combined into a composite image signal.

In a second aspect, the invention is a method for providing a composite video image having multiple focal lengths. The method comprises a step of providing an imaging apparatus having a multi-focal lens system for observing a scene. The multi-focal lens system has a plurality of focal lengths arranged along a cyclic path. A drive mechanism is provided for moving the multi-focal lens system. The multi-focal lens system forms a plurality of optical images as the multi-focal lens system is moved through the cyclic path. Each optical image corresponds to one of the plurality of focal lengths. Each of the plurality of optical images is converted into a corresponding image signal, each image signal including a plurality of pixels representative of the scene. Each image signal is divided into a plurality of image elements, each image element including at least one pixel. Sets of corresponding image elements are identified, wherein each corresponding image element corresponds to a same given portion of the scene. For each set of corresponding image elements, a preferred image element is selected, which provides preferred focus characteristics. Each of the preferred image elements is saved in a computer memory. The preferred image elements are combined into a composite image signal.

In a third aspect, the invention is an imaging apparatus providing a stream of sequences of optical images, each sequence of optical images including a series of optical images. Each optical image of the series having a unique focal length. The apparatus comprises a multi-focal lens capable of observing a scene. The multi-focal lens has a plurality of focal lengths arranged along a rotary path. A rotary drive mechanism is provided, capable of rotating the multi-focal lens. The multi-focal lens system forms the sequence of optical images as the multi-focal lens rotates through a 360 degree rotation. Each optical image corresponds to one of a plurality of focal lengths. An image pickup device capable of converting each optical image of the sequence of optical images into a corresponding image signal is provided. An image processor is operative to save in computer memory each optical image of the sequence of optical images. The image processor provides and saves with each optical image an identifier corresponding to the focal length associated with each optical image.

In yet a fourth aspect, the invention is a method for providing a stream of sequences of optical images, each sequence of optical images including a series of optical images. Each optical image of the series has a unique focal length. The method comprises a step of providing an imaging apparatus having a multi-focal lens capable of observing a scene. The multi-focal lens has a plurality of focal lengths arranged along a rotary path. A rotary drive mechanism capable of rotating the multi-focal lens is provided. The multi-focal lens system forms each series of optical images as the multi-focal lens rotates through a 360 degree rotation. Each optical image corresponds to one of a plurality of focal lengths. Each optical image of the sequence of optical images is converted into a corresponding image signal. An image processor is used to save in computer memory each optical image of the sequence of optical images. The image processor provides and saves with each optical image an identifier corresponding to the focal length associated with each optical image.

BRIEF DESCRIPTION OF THE SEVERAL VIEWS OF THE DRAWINGS

The following detailed description of preferred embodiments of the invention will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
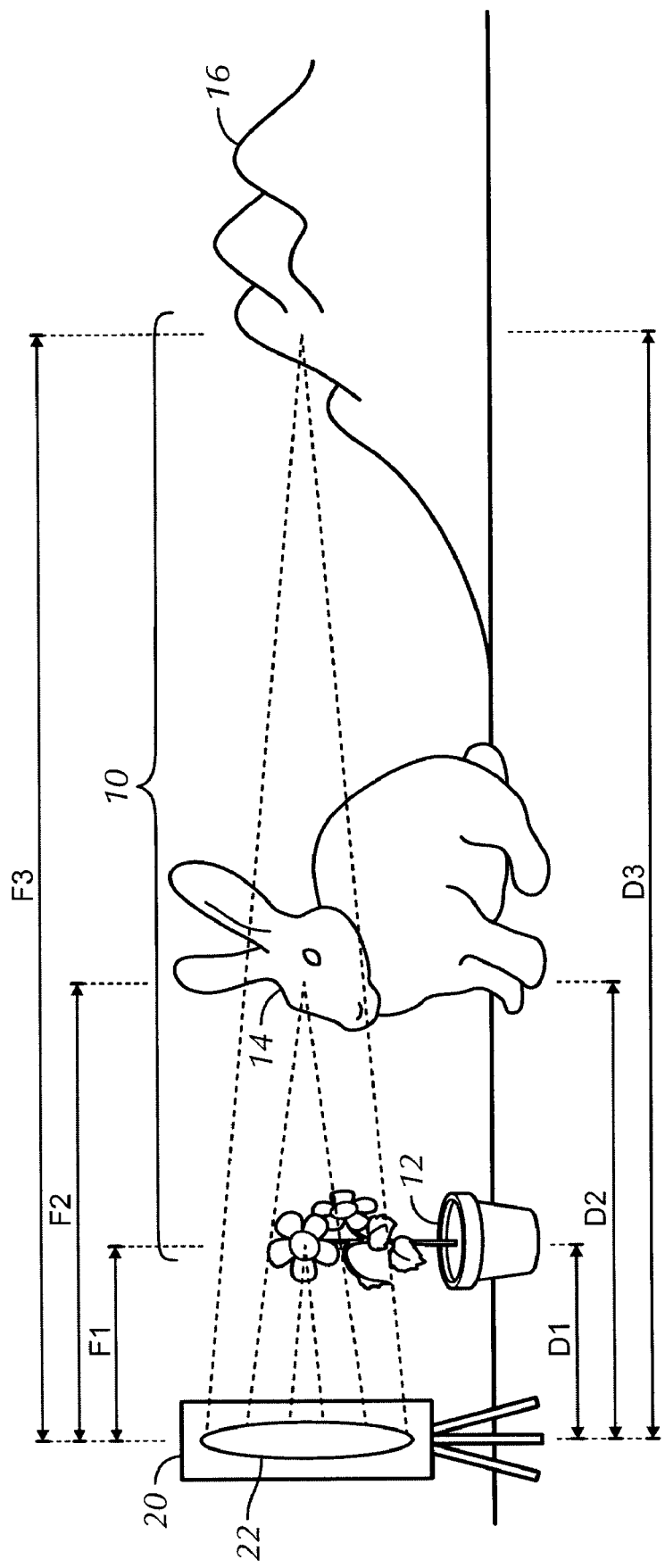
FIG. 1 is schematic representation of an image scene having elements positioned at various focal depths.

As used herein, when introducing elements of the present invention or the preferred embodiments thereof, the articles "a", "an", "the" and "said" are intended to mean that there are one or more of the elements. Throughout the drawings, the same reference numerals or letters are used to designate like or equivalent elements. Detailed descriptions of known functions and constructions unnecessarily obscuring the subject matter of the present invention have been omitted for clarity. The drawings are not necessarily drawn to scale.

Figure 2:
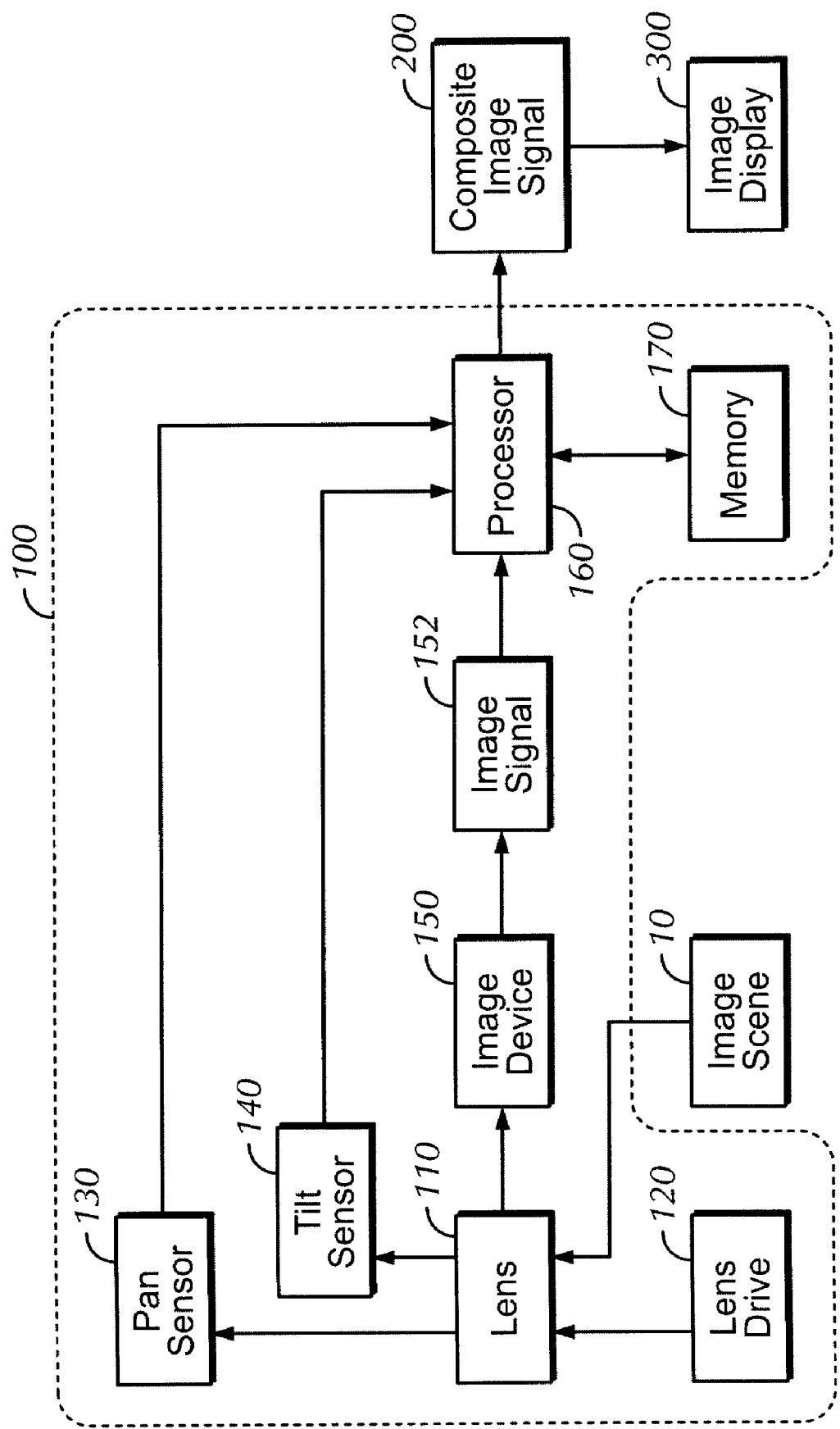
FIG. 2 is a schematic block diagram of an imaging apparatus in accordance with a preferred embodiment of the present invention.

With reference to FIG. 2, there is shown in accordance with a preferred embodiment of the present invention a block diagram of an imaging apparatus 100 providing a composite video image having multiple focal lengths. An image scene 10 is an input to the imaging apparatus 100, and a composite image signal 200, provided in real-time or near real-time, is an output of the imaging apparatus 100. The composite image signal 200 is capable of being viewed on a conventional image display 300, such as a television.

Figure 3:
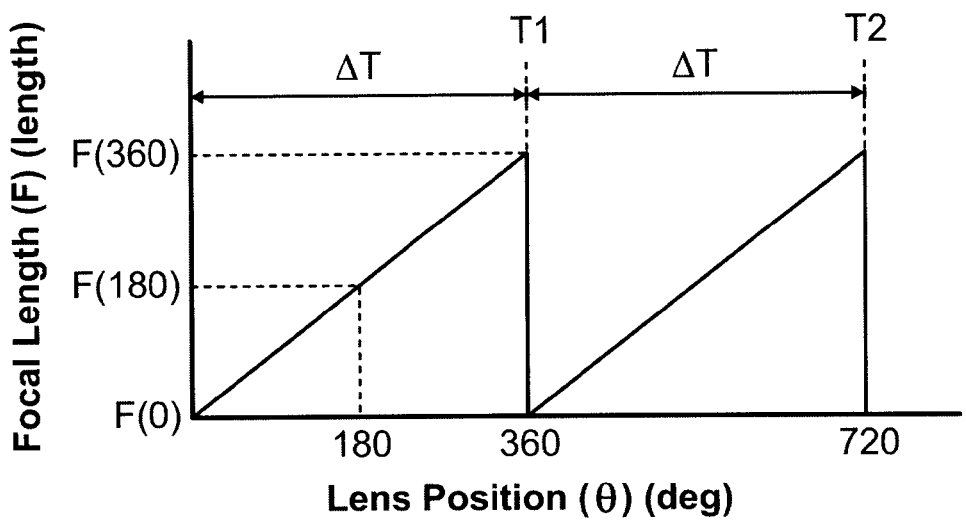
FIG. 3 is a graph illustrating change of focal length of the camera system of FIG. 2 with position of a lens system along a cyclic path.

The imaging apparatus 100 comprises a multi-focal lens system 110 capable of observing the image scene 10. In a first embodiment, the multi-focal lens systems 110 may be two or more lenses capable of linear movement relative to one another. Such a multi-lens system is disclosed in U.S. Pat. No. 7,110,185 (Saori), the subject matter of which is incorporated herein by reference. Alternatively, in a second embodiment, the multi-focal lens system 110 is a unitary rotary lens having multiple focal lengths arranged circumferentially. That is, at a first angular position, the rotary lens provides a first focal length F1. At a second angular position, the rotary lens provides a second focal length F2. Similarly, multiple focal lengths F are provided by the rotary lens at various angular positions, θ, as illustrated in FIG. 3. It will be appreciated that FIG. 3 applies to both a system of lenses moving linearly relative to one another thorough a cyclic path, as well as to rotary lens rotating through a cyclic path.

With continued reference to FIG. 2, the imaging apparatus 100 further comprises a drive mechanism 120 capable of moving the multi-focal lens system 110 through a cyclic path (either a linear path which is repeated cyclically or a rotary path likewise repeated cyclically). The drive mechanism 120 is conventional, and need not be described in detail.

As the multi-focal lens system 110 moves along its cyclic path, a plurality of optical images are formed by the multi-focal lens system 110. Each optical image corresponds to one of the plurality of focal lengths F. For reasons discussed below, pan and tilt movement of the multi-focal lens system 110 is preferably sensed by a pan sensor 130 and a tilt sensor 140, respectively.

An image pickup device 150 is capable of converting each of the plurality of optical images into a corresponding image signal 152. Preferably, the image pickup device 150 is a charge-coupled device (CCD). Each image signal 152 includes a plurality of pixels representative of the image scene 10.

Figure 4:
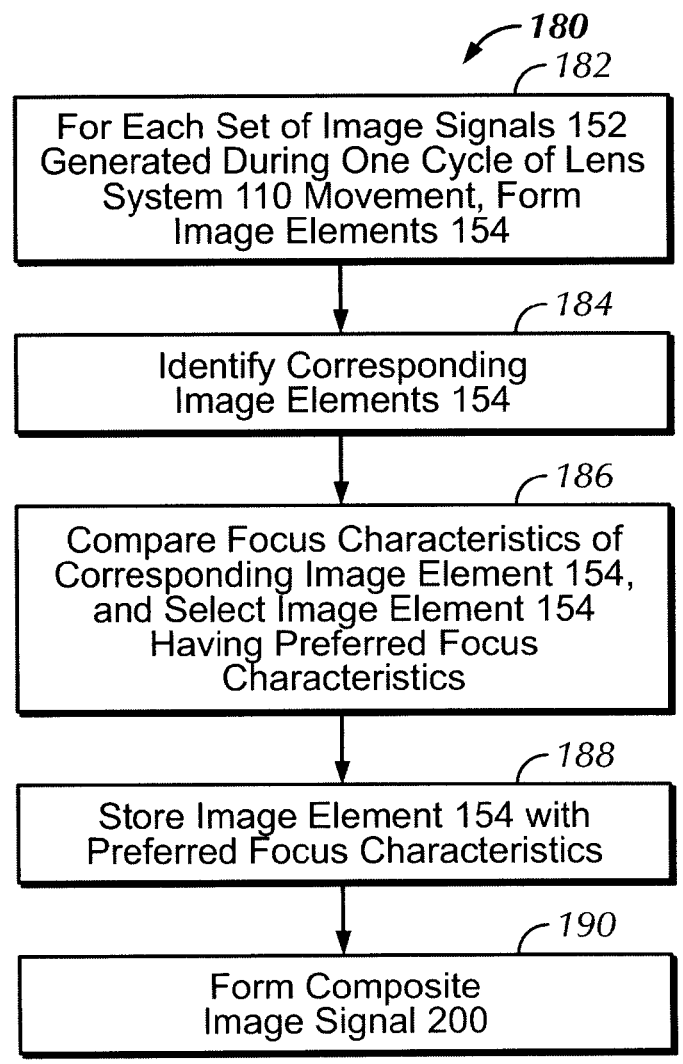
FIG. 4 is a block diagram of a process executed by an image processor of the camera system of FIG. 2.

The image signals 152 are provided to an image processor 160. With reference to FIG. 4, in a preferred method of operation, the image processor 160 executes a process 180 for each set of image signals 152 generated during one cycle of movement of the multi-focal lens system 110 to generate the composite image signal 200. In particular, in a first step 182, the image processor 160 is operative to divide each image signal 152 into a plurality of image elements 154 (see FIGS. 5-7). Each image element 154 includes at least one pixel. In a second step 184, the image processor 160 operates to identify sets of corresponding image elements 154, wherein each element 154 corresponds to a given portion of the scene 10. In a third step 186, for each set of corresponding image elements 154, a preferred image element is selected which provides preferred focus characteristics. In a fourth step 188, the image element 154 providing preferred focus characteristics is saved in computer memory 170. In a fifth step 190, the preferred image elements are combined into the composite image signal 200.

Figure 5:
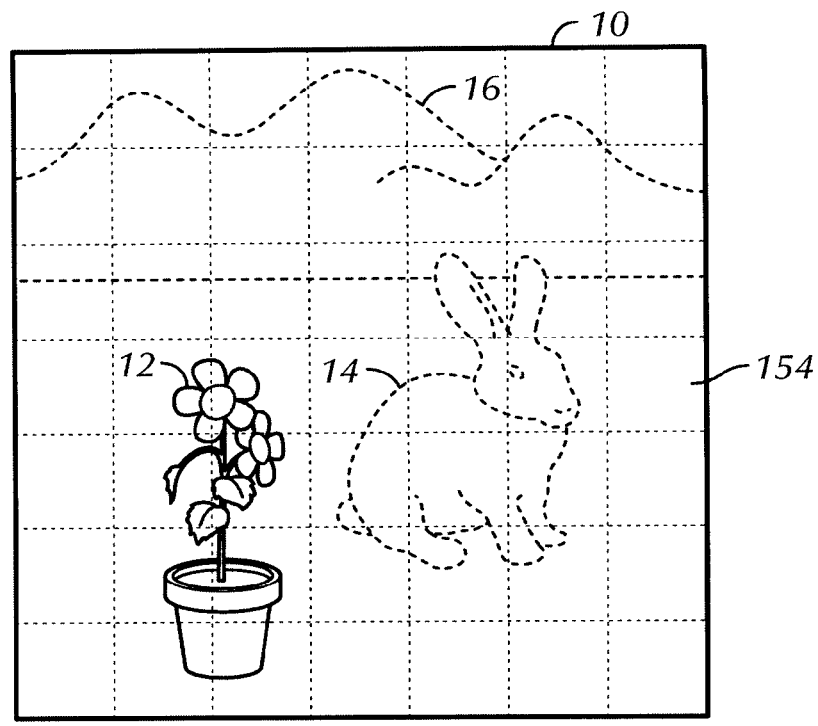
FIG. 5 is an illustration of an image scene as viewed with the lens system of FIG. 3 positioned at a first position along the cyclic path.
Figure 6:
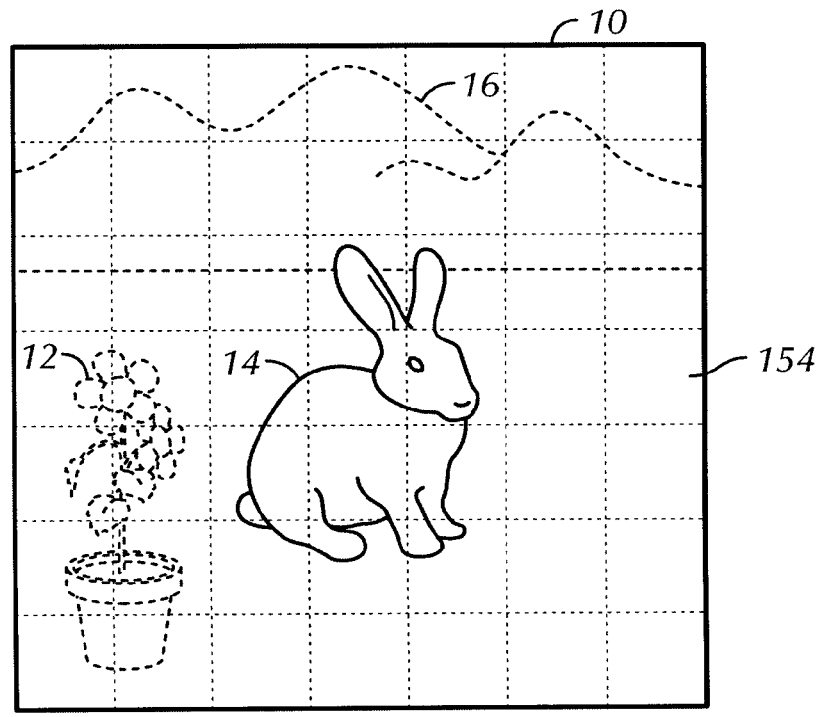
FIG. 6 is an illustration of an image scene as viewed with the lens system of FIG. 3 positioned at a second position along the cyclic path.
Figure 7:
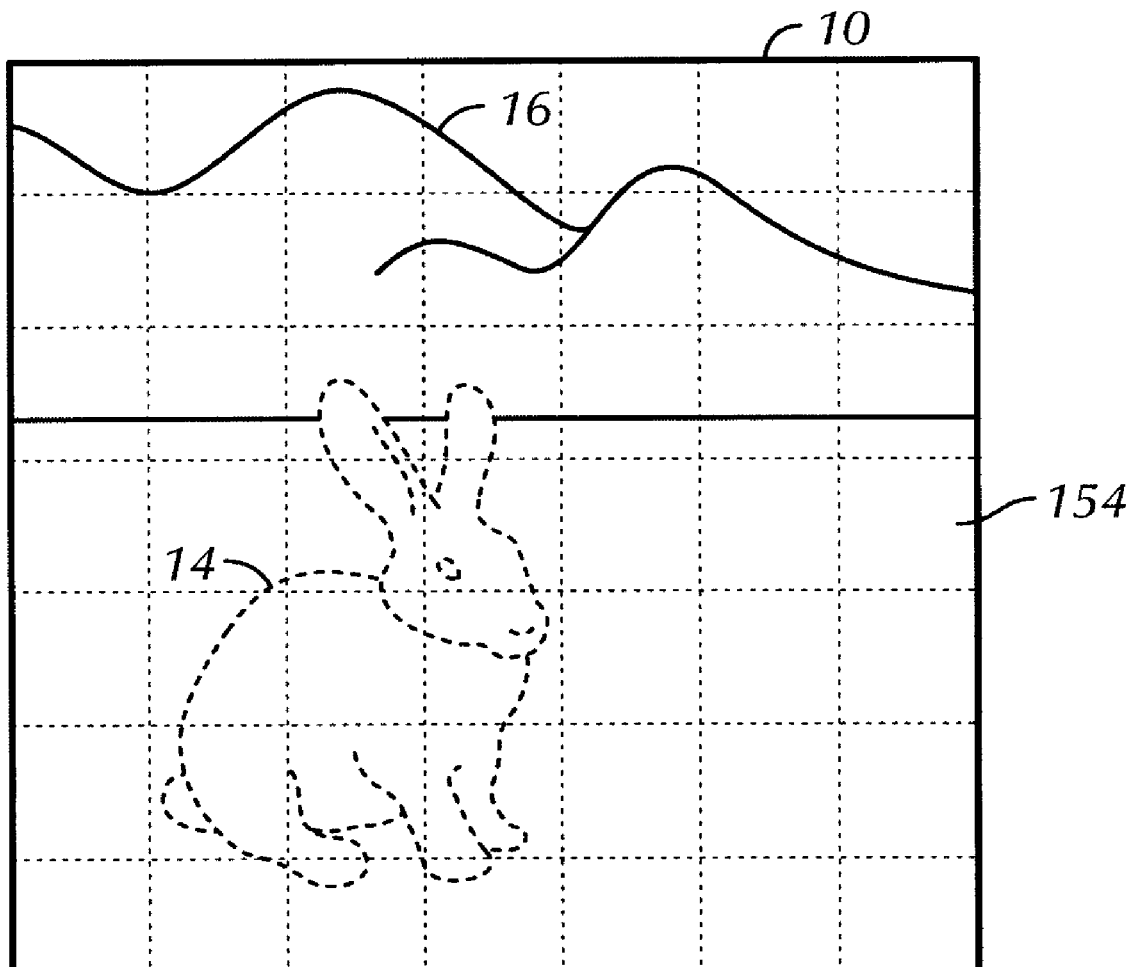
FIG. 7 is an illustration of an image scene as viewed with the lens system of FIG. 3 positioned at a third position along the cyclic path.

With reference to FIGS. 5-7, a series of image scenes 10 corresponding to image signals 152 taken at different points along the cyclic path of the multi-focal lens system 110 illustrate aspects of operation of the image processor 160. FIG. 5 illustrates an image scene 10 occurring at a first point (for example, lens position θ corresponding to 0 degrees) along the lens system 110 path. The image scene 10 is divided into the plurality of image elements 154. In this particular illustration, the lens system 110 has a short focal length F(0), and only those objects (such as the flower 12) positioned near the lens system 110 are in focus. Objects located outside the short focal length F(0), such as the rabbit 14 and the mountains 16 are out of focus (as indicated by dashed lines). With reference to FIG. 6, as the lens system 110 moves along its cyclic path to a second point (for example, lens position θ=180 degrees), the image scene 10 may change, due to movement (pan or tilt) of the multi-focal lens system 110 or movement of the subject matter of the image scene. Additionally, as the focal length of the lens system 110 changes to F(180), near objects (such as flower 12) in focus with first focal length F(0) move outside the second focal length F(180), and other objects (such as rabbit 14) move into focus. Similarly, with reference to FIG. 7, as the multi-focal lens system 110 moves to a third position along the cyclic path (for example, a lens position θ=360 degrees), the image scene 10 may change yet again due to movement of the lens system 110 or subject matter. As the focal length of the lens system 110 changes to F(360), objects (such as flower 12 and rabbit 14) move out of the focal length associated with F(360) while other objects (such as mountains 16) move into focus.

To facilitate the second step 184 of identifying sets of corresponding image elements, it is preferred to use information provided by the pan and tilt movement tracking sensors 130 and 140, respectively. More particularly, as suggested by FIGS. 5-7 and discussed above, objects in the image scene 10 may either move during the time required by the multi-focal lens system 110 to move through its cyclic path. Alternatively, the camera assembly housing the multi-focal lens system 110 may be moved (panned or tilted) during the time required to move through the cyclic path. The pan and tilt sensor information may be used by the image processor 160 to help track changes in the image scene 10 caused by movement of the multi-focal lens system 110.

To track changes in the image scene 10 occurring during movement of the lens system 110 during the cyclic path, it is further preferred to employ pattern recognition techniques known in the art to identify the sets of corresponding image elements (step 184).

The third step 186 of selecting the image element 154 having preferred focus characteristics is performed using techniques known in the art, for example, for example, techniques disclosed in U.S. Pat. No. 6,344,930 (Kancko et al.); U.S. Pat. No. 6,927,922 (George et al.); and U.S. Pat. No. 7,110,185 (Saori).

It is further preferred that the drive mechanism 120 operate to move the multi-focal lens system 110 through the cyclic path at a rate resulting in 25 to 30 composite image signals 200 per second.

In an alternative preferred embodiment, not separately illustrated, a second imaging apparatus 100a, rather than generating a composite image 200, simply generates a stream of sequences of optical images, each sequence of optical images including a series of optical images, each optical image of the series having a unique depth of field or focal length F. The second imaging apparatus 100a comprises the multi-focal lens system 100, which is capable of observing the image scene 10. The drive mechanism 120 is capable of moving the multi-focal lens system through a cyclic (preferably rotary) path. The multi-focal lens system 100 forms the sequence of optical images as the multi-focal lens system 100 moves through the cyclic path. Each optical image corresponds to one of the plurality of focal lengths F. The second imaging apparatus 100a further comprises the image pickup device 150 capable of converting each of the sequence of optical images into the corresponding image signal 152. The image processor 160 is operative to save in computer memory each optical image contained in the sequence of optical images. The image processor 160 provides and saves with each optical image an identifier corresponding to the image's focal length F.

Operation of the second imaging apparatus 100a relies upon the residual-image phenomenon that characterizes human eyesight. If presented with a series of images of a scene sufficiently rapidly, such that only a portion of the scene is presented in focus by each image, and such that the series of images taken as a whole presents the entire scene in focus, then given the residual-image phenomenon, the viewer will perceive the entire image as being in focus. Assume a video has been produced having 6 depths of field corresponding to six focal lengths F1-F6. However, rather than producing a composite image 200, the video would comprise a stream of sequential images taken at the six focal lengths F1-F6. For example, if the video comprises thirty frames per second, each second of video would comprise five images each at F1-F6, respectively.

In a preferred implementation of the second imaging apparatus 100a, and again assuming six focal lengths F1-F6, header data contained in the video file would include an identifier which identifies the focal length characteristics of each frame, for example with a numeric identifier 1 through 6 corresponding to focal lengths F1-F6, respectively. A playback option (or hard-coded choice made at final processing if the director chooses to select layers on the fly) could be provided to select playback of a director's cut. That is, the director would have identified which frame depth(s) to use, and then the playback would include the preferred in-focus frame data as specified by the director.

In another preferred implementation of the second imaging apparatus 100a, the frame by frame depth of field header identifier could be used to allow playback of a video having multiple focal lengths on playback devices having various levels of capability. That is, an older video playback device would use a director's cut comprising single depth images (as older technology in the playback device could not post-process the multi-depth data). Similarly, a playback device having enhanced processing capability could process multiple focal lengths, up to the device's processing limits. For example, an advanced playback machine could process all six focal lengths, while a less-capable device might be able to process only three focal lengths. The default depths would probable be best to use the middle frames, and track the director's cut (use director's cut as the midpoint) and process on both sides of the mid-point.

From the foregoing it can be seen that the present invention provides an apparatus and a method for providing a composite video image having multiple focal lengths, such that different objects at different distances are all in focus.

It will be appreciated by those skilled in the art that changes could be made to the embodiments described above without departing from the broad inventive concept thereof. It is to be understood, therefore, that this invention is not limited to the particular embodiments disclosed, but it is intended to cover modifications within the spirit and scope of the present invention as defined by the appended claims.

That which is claimed is:

1. A digital video camera providing a composite video image having multiple focal lengths comprising:
   a multi-focal lens system capable of observing a scene;
   a drive mechanism capable of moving the multi-focal lens system through a cyclic path, wherein the multi-focal lens system forms a plurality of optical images as the multi-focal lens system moves through the cyclic path, each optical image corresponding to one of the plurality of focal lengths;
   an image pickup device capable of converting each of the plurality of optical images into a corresponding image signal, each image signal including a plurality of pixels representative of the scene;
   an image processor operative to:
      divide each image signal into a plurality of image elements, each image element including at least one pixel;
      identify sets of corresponding image elements wherein each element corresponds to a given portion of the scene;
      for each set of corresponding image elements, select a preferred image element which provides preferred focus characteristics;
      save in computer memory the preferred image element providing the preferred focus characteristics; and
      combine the preferred image elements into a composite image signal,
      wherein the image processor is further operative to save in computer memory each optical image of the plurality of optical images, wherein the image processor provides and saves with each optical image an identifier corresponding to the focal length associated with each optical image wherein each optical image presents only a portion of a scene in focus at the focal length associated with each image; and pan and tilt movement tracking sensors providing pan and tilt information to the image processor to facilitate identification of the sets of corresponding image elements, said pan and tilt movement tracking sensors tracking changes in the scene due to movement of the multi-focal lens system or movement of the scene;

wherein all of the multi-focal lens system, drive mechanism, image pickup device, image processor and pan and tilt movement tracking sensors are within the digital video camera.

2. The digital video camera of claim 1 wherein the image processor is further operative to recognize patterns in the image signal to facilitate identification of the sets of corresponding image elements.

3. The digital video camera of claim 1 wherein the image pickup device is a charge-coupled device.

4. The digital video camera of claim 1 wherein the drive mechanism moves the multi-focal lens through the cyclic path at a rate resulting in 25 to 30 composite image signals per second.

5. The digital video camera of claim 1 wherein the multi-focal lens system is a multi-focal lens having a plurality of focal lengths arranged along a rotary path.

6. The digital video camera of claim 5 wherein the drive mechanism rotates the multi-focal lens.

7. The digital video camera of claim 6 wherein the cyclic path is a rotation through 360 degrees.

8. A method for providing a composite video image having multiple focal lengths comprising steps of:
providing a digital video camera having a multi-focal lens system for observing a scene, the multi-focal lens system having a plurality of focal lengths arranged along a cyclic path and a drive mechanism for moving the multi-focal lens system, wherein the multi-focal lens system forms a plurality of optical images as the multi-focal lens system is moved through the cyclic path, each optical image corresponding to one of the plurality of focal lengths;
converting each of the plurality of optical images into a corresponding image signal, each image signal including a plurality of pixels representative of the scene;
dividing each image signal into a plurality of image elements, each image element including at least one pixel;
identifying sets of corresponding image elements wherein each corresponding image element corresponds to a same given portion of the scene, wherein identifying sets of corresponding image elements is performed at least in part using information provided by pan and tilt movement tracking sensors within the digital video camera, said pan and tilt movement tracking sensors tracking changes in the scene due to movement of the multi-focal lens system or movement of the scene;
for each set of corresponding image elements, selecting a preferred image element which provides preferred focus characteristics;
saving each of the preferred image elements in a computer memory;
combining the preferred image elements into a composite image signal; and
using an image processor to save in computer memory each optical image of the plurality of optical images, wherein the image processor providing and saving with each optical image an identifier corresponding to the focal length associated with each optical image wherein each optical image presenting only a portion of a scene in focus at the focal length associated with each image.

9. The method of claim 8 wherein the step of identifying sets of corresponding image elements is performed at least in part by recognition of patterns in the image signal.

10. The method of claim 8 wherein the step of converting each of the plurality of optical images into a corresponding image signal is performed using a charge-coupled device.

11. The method of claim 8 wherein the drive mechanism moves the multi-focal lens system through the cyclic path at a rate resulting in 25 to 30 composite images per second.

12. An imaging apparatus providing a stream of sequences of optical images, each sequence of optical images including a series of optical images, each optical image of the series having a unique focal length, the apparatus comprising:
a multi-focal lens capable of observing a scene, the multi-focal lens having a plurality of focal lengths arranged along a rotary path;
a rotary drive mechanism capable of rotating the multi-focal lens, wherein the multi-focal lens system forms the sequence of optical images as the multi-focal lens rotates through a 360 degree rotation, each optical image corresponding to one of a plurality of focal lengths;
an image pickup device capable of converting each optical image of the sequence of optical images into a corresponding image signal, and
an image processor operative to save in computer memory each optical image of the sequence of optical images, wherein the image processor provides and saves with each optical image an identifier corresponding to the focal length associated with each optical image wherein each optical image presents only a portion of a scene in focus at the focal length associated with each image.

13. A method for providing a stream of sequences of optical images, each sequence of optical images including a series of optical images, each optical image of the series having a unique focal length, the method comprising steps of:
providing an imaging apparatus having a multi-focal lens capable of observing a scene, the multi-focal lens having a plurality of focal lengths arranged along a rotary path, and a rotary drive mechanism capable of rotating the multi-focal lens, wherein the multi-focal lens system forms each series of optical images as the multi-focal lens rotates through a 360 degree rotation, each optical image corresponding to one of a plurality of focal lengths;
converting each optical image of the sequence of optical images into a corresponding image signal;
using an image processor to save in computer memory each optical image of the sequence of optical images, wherein the image processor provides and saves with each optical image an identifier corresponding to the focal length associated with each optical image wherein each optical image presents only a portion of a scene in focus at the focal length associated with each image.

14. The method of claim 13, further comprising steps of:
providing a video playback device;
saving the sequence of optical images onto a digital media storage device;
operably coupling the digital media storage device to the playback device; and
allowing a user to select replay on the playback device of only those optical images having the same one or more identifiers such that a composite image comprising those optical images having the same one or more identifiers and only a portion of the scene in focus is presented in totality in focus.

15. The apparatus of claim 12 further comprising a play back device to play back at least a portion of the optical images based on the identifier associated with each optical image.

16. The apparatus of claim 12 further comprising a play back device to play back at least a portion of the optical images based on the identifier associated with each optical image such that a composite image comprising the at least a portion of the optical images and having a portion of the scene in focus is presented in totality in focus.

* * * * *